United States Patent [19]

Okuyama et al.

[11] Patent Number: 5,418,788
[45] Date of Patent: May 23, 1995

[54] DATA LINK TERMINATOR

[75] Inventors: Yuzo Okuyama; Satoshi Kakuma, both of Kawasaki, Japan

[73] Assignee: Fujitsu Limited, Kawasaki, Japan

[21] Appl. No.: 168,398

[22] Filed: Dec. 17, 1993

Related U.S. Application Data

[63] Continuation of Ser. No. 787,113, Nov. 4, 1991, abandoned.

[30] Foreign Application Priority Data

Nov. 2, 1990 [JP] Japan .................................. 2-295272

[51] Int. Cl.⁶ .................................................. H04J 3/02
[52] U.S. Cl. .................................. 370/110.1; 370/112
[58] Field of Search .................. 370/112, 110.1, 100.1, 370/105.1

[56] References Cited

U.S. PATENT DOCUMENTS

| | | | |
|---|---|---|---|
| 4,052,566 | 10/1977 | Mackay | 370/112 |
| 4,727,495 | 2/1988 | Cheetham et al. | 370/112 |
| 4,975,913 | 12/1990 | Watanabe et al. | 370/112 |
| 5,151,901 | 9/1992 | Shenoi et al. | 370/112 |

*Primary Examiner*—Douglas W. Olms
*Assistant Examiner*—Min Jung
*Attorney, Agent, or Firm*—Staas & Halsey

[57] ABSTRACT

A multiplexer multiplexes data of data links received from respective digital lines over to an intraoffice link. A terminator extracts data of the data links received from the respective digital lines multiplexed over to a corresponding intraoffice link, and processes them in a batch. When respective data links are configured by using frame synchronization bits, e.g. at a predetermined frame timing for multiframes, the multiplexer multiplexes frame synchronization bits without shedding their synchronization pattern over to the intraoffice link, and the terminator extracts only the received data of the data links by the frame synchronization bits. In this case, on multiplexing only the frame synchronization bits from respective digital lines, the multiplexer multiplexes identification data indicating that the multiplexing timing is at the head end frames of multiframes. The terminator extracts the identification data and identifies the timing for the head end frames of the multiframes.

10 Claims, 8 Drawing Sheets

| FRAME NO | BIT NO | F-BIT | | |
|---|---|---|---|---|
| | | FPS | FDL | CRC |
| 1 | 0 | - | m | - |
| 2 | 193 | - | - | C1 |
| 3 | 386 | - | m | - |
| 4 | 579 | 0 | - | - |
| 5 | 772 | - | m | - |
| 6 | 965 | - | - | C2 |
| 7 | 1158 | - | m | - |
| 8 | 1351 | 0 | - | - |
| 9 | 1554 | - | m | - |
| 10 | 1737 | - | - | C3 |
| 11 | 1930 | - | m | - |
| 12 | 2123 | 1 | - | - |
| 13 | 2316 | - | m | - |
| 14 | 2509 | - | - | C4 |
| 15 | 2702 | - | m | - |
| 16 | 2895 | 0 | - | - |
| 17 | 3088 | - | m | - |
| 18 | 3281 | - | - | C5 |
| 19 | 3474 | - | m | - |
| 20 | 3667 | 1 | - | - |
| 21 | 3860 | - | m | - |
| 22 | 4053 | - | - | C6 |
| 23 | 4246 | - | m | - |
| 24 | 4439 | 1 | - | - |

FIG. 5

| FRAME NO | BIT1 | BIT2 | BIT3 | BIT4 | BIT5 | BIT6 | BIT7 | BIT8 |
|---|---|---|---|---|---|---|---|---|
| 0 | | | | | | | | |
| 1 | | | | | | | | |
| 2 | | | | | | | | |
| 3 | | | | | | | | |
| 4 | | | | | | | | |
| 5 | | | | | | | | |
| 6 | | | | | | | | |
| 7 | DATA LINK | DATA LINK | DATA LINK | DATA LINK | DATA LINK | DATA LINK | DATA LINK | SYNC BIT |
| 8 | | | | | | | | |
| 9 | | | | | | | | |
| 10 | | | | | | | | |
| 11 | | | | | | | | |
| 12 | | | | | | | | |
| 13 | | | | | | | | |
| 14 | | | | | | | | |
| 15 | | | | | | | | |

FIG. 6

| FUNCTION | 16-BIT CODE ASSIGNMENT |
|---|---|
| IDLE | 0 111111 0 01111110 |
| YELLOW | 0 000000 0 11111111 |
| | |
| LINE LOOPBACK ACTIVATE | 0 000111 0 11111111 |
| LINE LOOP DEACTIVATE | 0 011100 0 11111111 |
| PAYLOAD LOOPBACK ACTIVATE | 0 001010 0 11111111 |
| PAYLOAD LOOPBACK DEACTIVATE | 0 011001 0 11111111 |
| | |
| PROTECTION SWITCH LINE 1 | 0 100001 0 11111111 |
| PROTECTION SWITCH LINE 2 | 0 100010 0 11111111 |
| PROTECTION SWITCH LINE 3 | 0 100011 0 11111111 |
| ⋮ | ⋮ |
| PROTECTION SWITCH LINE 25 | 0 111001 0 11111111 |
| PROTECTION SWITCH LINE 26 | 0 111010 0 11111111 |
| PROTECTION SWITCH LINE 27 | 0 111011 0 11111111 |
| | |
| PROTECTION SWITCH ACKNOWLEDGE | 0 001100 0 11111111 |
| PROTECTION SWITCH COMPLETE | 0 010101 0 11111111 |
| PROTECTION SWITCH RELEASE | 0 001101 0 11111111 |
| FORCED PROTECTION SWITCH RELEASE | 0 001101 0 11111111 |
| | |
| RESERVED | 0 001011 0 11111111 |
| RESERVED | 0 001111 0 11111111 |
| RESERVED | 0 011101 0 11111111 |

FIG. 7A

| Octet No. | Bit Number | | | | | | | | |
|---|---|---|---|---|---|---|---|---|---|
| | 8 | 7 | 6 | 5 | 4 | 3 | 2 | 1 | |
| 1 | FLAG | | | | | | | | |
| 2 | SAPI | | | | | | CR | EA | |
| 3 | TEI | | | | | | | EA | |
| 4 | CONTROL | | | | | | | | |
| 5 | G3 | LV | G4 | U1 | U2 | G5 | SL | G6 | ⎫ |
| 6 | FE | SE | LB | G1 | R | G2 | Nm | $N_1$ | ⎬ |
| 7 | G3 | LV | G4 | U1 | U2 | G5 | SL | G6 | ⎬ |
| 8 | FE | SE | LB | G1 | R | G2 | Nm | $N_1$ | ⎬ ONE-SECOND REPORT |
| 9 | G3 | LV | G4 | U1 | U2 | G5 | SL | G6 | ⎬ |
| 10 | FE | SE | LB | G1 | R | G2 | Nm | $N_1$ | ⎬ |
| 11 | G3 | LV | G4 | U1 | U2 | G5 | SL | G6 | ⎬ |
| 12 | FE | SE | LB | G1 | R | G2 | Nm | $N_1$ | ⎭ |
| 13/14 | FCS | | | | | | | | |
| 15 | FLAG | | | | | | | | |

FIG. 7B

| | BITS | LAPD BITS DESCRIPTION |
|---|---|---|
| FLAG | -01111110 | FRAME DELIMITERS |
| SAP1 | -001110(14) | SERVICE ACCESS POINT IDENTIFIER |
| C/R | -0(FROM C1) -1(FROM CARRIER) | COMMAND/RESPONSE |
| EA | -0(OCTET 2) -1(OCTET3) | EXTENDED ADDRESS |
| TEI | -0000000 | TERMINAL ENDPOINT IDENTIFIER |
| CONTROL | -00000011 | UNACKNOWLEDGED INFORMATION TRANSFER |

| | BITS | APPLICATION SPECIFIC BITS DESCRIPTION |
|---|---|---|
| G1 | -1 | CRC ERROR EVENT - 1 |
| G2 | -1 | $1 <$ CRC ERROR EVENT $\leq 5$ |
| G3 | -1 | $5 <$ CRC ERROR EVENT $\leq 10$ |
| G4 | -1 | $10 <$ CRC ERROR EVENT $\leq 100$ |
| G5 | -1 | $100 <$ CRC ERROR EVENT $\leq 319$ |
| G6 | -1 | CRC ERROR EVENT $\leq 320$ |
| SE | -1 | SEVERELY ERRORED FRAMING EVENT $\leq 1$ (FE SHALL = 0) |
| FE | -1 | FRAME SYNCHRONIZATION BIT ERROR EVENT $\leq 1$ (SE SHALL = 0) |
| LV | -1 | LINE CODE VIOLATION EVENT $\leq 1$ |
| SL | -1 | CONTROLLED SLIP EVENT $\leq 1$ |
| LB | -1 | PAYLOAD LOOPBACK ACTIVATED |
| R | -0 | RESERVED (DEFAULT VALUE IS 0) |
| $N_m, N_1$ | -00,01,10,11 | MODULUS 4 COUNTER, MOST AND LEAST SIGNIFICANT BITS |
| U1,U2 | -0 | UNDER STUDY FOR NETWORK SYNCHRONIZATION STATUS |

DATA LINK TERMINATOR

This application is a continuation of U.S. patent application Ser. No. 07/787,113, filed on Nov. 4, 1991, now abandoned.

BACKGROUND OF THE INVENTION

1. Field of the Invention

This invention pertains to a data link terminator for a plurality of time-divisionally multiplexing digital lines.

2. Description of the Related Art

With recent advances in ISDN (integrated services digital network) technology, time-divisionally multiplexing digital lines are becoming increasingly important.

With a time-divisionally multiplexing digital line, a technique is required for efficiently transmitting control data such as interoffice maintenance information, as well as communication information and call control information. Such an interoffice digital path is generally called an interoffice data link or simply a data link.

A representative data link configuration uses a frame synchronization bit (or simply F bit).

For instance, if ISDN primary rate digital interface has a transmission rate of one point five four four megabits per second (1.544 Mbits/s), one (1) frame comprises a total of one hundred ninety-three (193) bits. More specifically, a frame has twenty-four (24) time-divisionally multiplexed channels each having eight (8) bits and an F bit at the head end. A plurality of frames, each frame discerned by its F bit, are transmitted in a string. A string of frames is called a multiframe. A multiframe comprises twenty-four (24) frames on a time-divisionally multiplexing digital line or sixteen (16) frames on an intraoffice link, for example.

This transmission system allows bit data for a data link to be transmitted, as well as a pattern sequence for frame synchronization and a bit sequence for error correction. Because only the F bits (frame synchronization bits) of a half of all the frames, e.g. odd numbered frames, are extracted in demultiplexing frames as data links, a data link has a transmission rate of four kilobits per second (4 Kbits/s).

Conventionally, a switching office has its terminators, each equipped with an appropriate microprocessor, because respective digital lines extract and process control data transmitted over the respective digital lines using the above data links.

However, this technique has the problem that many terminators are required for processing data links, commensurately with the number of digital lines accommodated by a switching office, thus making the switcher expensive.

Since such a data link transmits control data according to a predetermined procedure based on a protocol such as the LAPD (Link Access Procedure by D channel), the microprocessor of a terminator needs to execute a program enabling data to be exchanged according to this procedure. However, this technique requires the microprocessor processing procedure to be changed at all digital line terminators when the protocol changes at some future point, making the technique quite cumbersome.

As described above, the prior art has the problem that the same processes must be duplicated for respective lines even though the same processing protocol is used for control data on the data links of respective digital lines.

SUMMARY OF THE INVENTION

This invention aims at enabling data links to be terminated with less burden even when the number of digital lines increase, and at easily coping with a change in a data link procedure.

This invention is premised on a data link terminator for terminating respective data links on plural time-divisional multiplex digital lines. It comprises a multiplexer for multiplexing data received from data links of respective digital lines over to an intraoffice link, and a terminator for extracting, for a batch processing, data received from the data links of respective digital lines and multiplexed over to an intraoffice link.

The above configuration requires few additional terminators and enables a lower-cost switcher to be used for terminating data links, even if the number of the original lines included in the intraoffice increases.

Even when a transmission protocol for data links does change, it enables the transmission procedure of a data link in the switching system to be changed easily, because a program in the processing procedure needs to be changed only at a terminator.

When data links have frame synchronization bits at predetermined frame timings for multiframes, the multiplexer multiplexes them without shedding their synchronization pattern, and the terminator extracts only the data received from the data links having the frame synchronization bits. This eliminates the necessity for having digital terminals provided for respective digital lines extract the data received from the data links by frame synchronization bits. This reduces the processing load other than at the terminator.

In this case, when the multiplexer multiplexes only the frame synchronization bits in the head end frames of multiframes, it also multiplexes identification data indicating that the multiplexing timing is at the head end frames of the multiframes. Then, the terminator extracts the identification data, and identifies the timing of the head end frames in the multiframes. This enables only data received from the data link to be extracted by frame synchronization bits.

BRIEF DESCRIPTION OF THE DRAWINGS

Those in the same field can easily understand additional objects and features of this invention from the attached drawings and the description of the preferred embodiment.

In the Drawings.

DESCRIPTION OF THE PREFERRED EMBODIMENT

Explanation of the Underlying Principle

Figure 1:
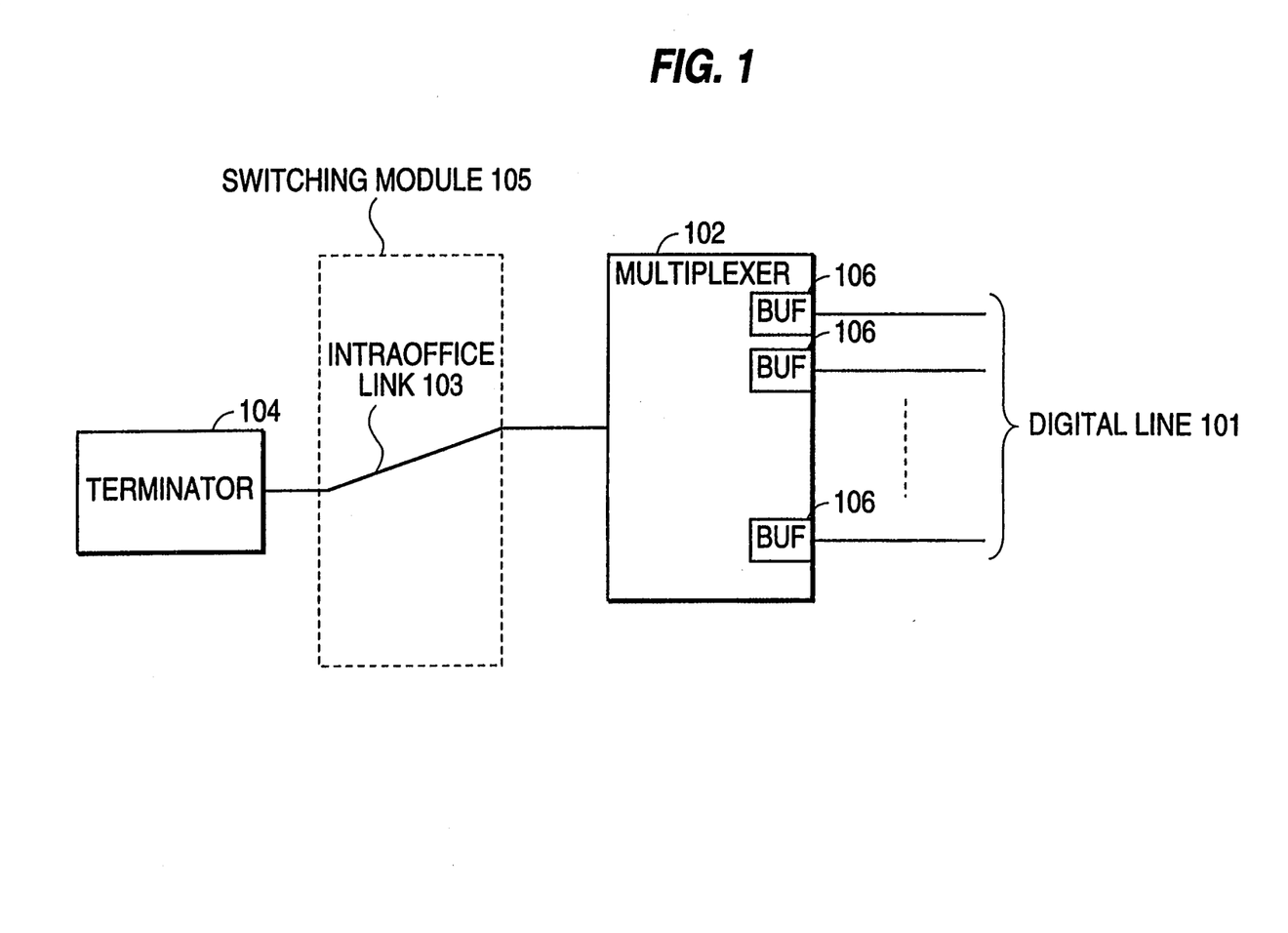
FIG. 1 is a block diagram of this invention.

FIG. 1 is a block diagram of this invention.

This invention is premised on a data link terminating system for terminating respective data links on plural time-divisionally multiplexing digital lines 101. The data link is for communicating control data between stations. The data link is different from a link of a communication signal. Respective digital lines 101 have multiframe configurations and respective data links are formed by using a frame synchronization bit appearing at a predetermined frame timing of units for a multiframe, for example.

A multiplexer 102 multiplexes data received from links for respective digital lines 101 over to an intraoffice link 103, such that the frame synchronization bits in the head end frames of the multiframes transmitted through corresponding digital lines 101, e.g. in the above configuration of multiframes, are multiplexed parallelly over to the intraoffice link 103.

Thus, the multiplexer 102 has buffers 106, such as elastic storage units provided corresponding to respective digital lines 101.

These buffers update write addresses synchronized with the received clock extracted from respective digital lines 101 and write frame synchronization bits of respective digital lines 101. In this case, write side reset pulses generated at timings for the head end of multiframes of respective digital lines 101 reset write addresses.

The buffers update the read addresses by common read pulses for respective digital links 101 independently from the above write operation and read the frame synchronization bits. At this time, a read side reset pulse common to respective data lines resets the read addresses.

When the multiplexer 102 multiplexes the frame synchronization bits in the head end frames of the multiframes which are selected from frame synchronization bits of respective frames in respective digital links 101, it also concurrently multiplexes the identification data indicating that the multiplexing timing is for the head end frame of the multiframe.

Further, the multiplexer 102 multiplexes the data received from the data links from respective digital lines 101 onto the predetermined bits provided corresponding to respective digital lines in a predetermined control channel of the intraoffice link 103.

Next, a terminator 104 extracts and processes in a batch the data received from the data links for respective digital lines 101 multiplexed on the intraoffice link 103. More specifically, the terminator 104 extracts, e.g. by the frame synchronization bits for respective digital lines 101 multiplexed over the intraoffice link 103, only the data received from the data links for respective digital lines 101 and processes them in a batch. The extraction is done by recognizing the identification data, for example. The intraoffice link 103 leads to the terminator 104 after being switched, e.g. by switching modules 105 in the switcher.

In addition to the above configuration, the terminator 104 can be optionally made to multiplex data sent to the data links for respective digital lines 101, in addition to processing received data. In this case, the terminator 104 also comprises a demultiplexer for demultiplexing data to be sent to the data links for respective digital lines 101 multiplexed over the intraoffice link 103.

The above configuration of this invention causes data received from the data links inputted from respective digital lines 101 to be processed in a batch by the terminator 104 after being multiplexed over to the intraoffice link 103 by the multiplexer 102, instead of being processed individually for respective digital lines 101 like the prior art.

Therefore, even if a switching office accommodates an increased number of the digital lines, there is hardly any necessity for adding extra terminators 104, thus decreasing a cost of the switcher for terminating a data link.

Even when a transmission protocol of a data link is altered, because only the terminator 104 needs to rewrite a program for the processing procedure, the transmission procedure of a data link such as in a switching system can be changed easily.

Here, when respective data links are configured by using frame synchronization bits at predetermined frame timings in multiframes, for example the multiplexer 102 multiplexes frame synchronization bits, without shedding a synchronization pattern, over to the intraoffice link 103. The terminator 104 extracts only the data received from the data link by the frame synchronization bits.

As a result, the digital terminals (DT) or the like provided in correspondence with respective digital lies 101 need not extract data received from data links by the frame synchronization bits. This reduces the processing load other than at the terminator 104.

In this case, the multiplexer 102 also multiplexes identification data indicating the multiplexing timing in the head end frames of multiframes when it multiplexes frame synchronization bits in the head end frames of multiframes of the frame synchronization bits in all frames on respective digital lines 101. The terminator 104 extracts the identification data and identifies the timings of the head end frames in multiframes. This enables the terminator 104 to extract data received from the data links by the frame synchronization bits.

Explanation of an Actual Embodiment

A preferred embodiment of this invention is explained in detail below by referring to the attached drawings.

Figure 2:
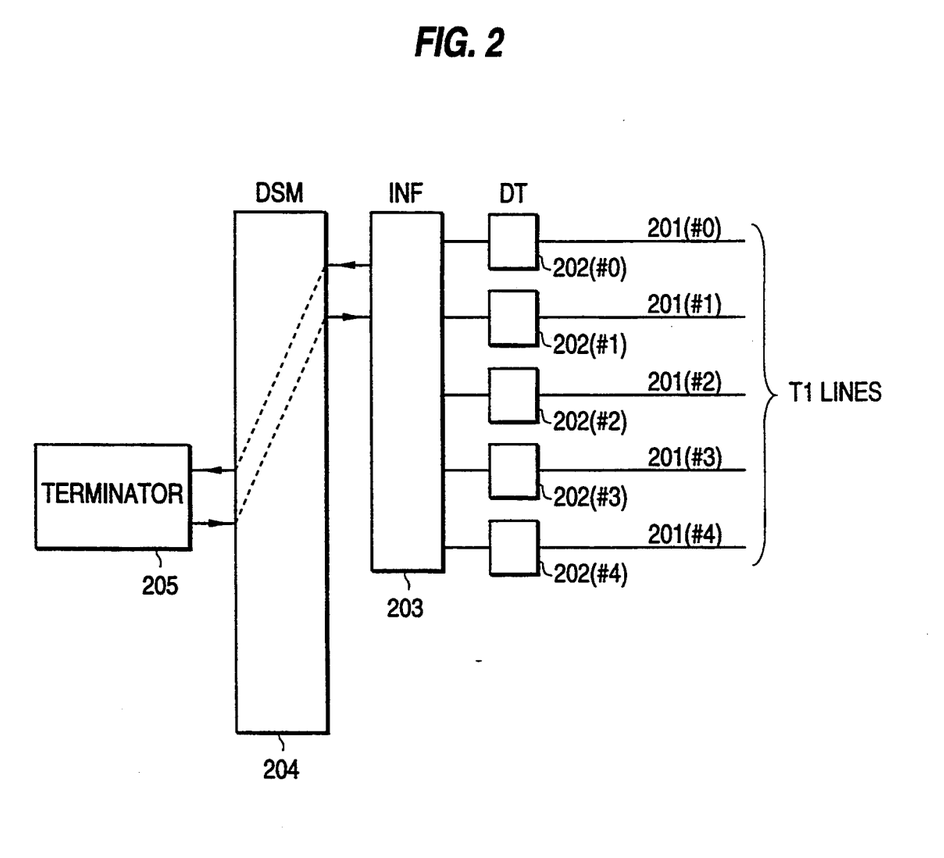
FIG. 2 is a schematic block diagram of an embodiment of this invention.

FIG. 2 is a schematic block diagram of an embodiment of this invention.

This embodiment shows an application of this invention to an electronic switcher for terminating five (5) lines of T1 line interfaces, which are the standard for ISDN primary rate interfaces.

In FIG. 2, five (5) T1 lines 201, #0 through #4, are terminated by five (5) digital terminals (DTs) 202, #0 through #4 provided corresponding to respective lines, and are accommodated by an interfacer (INF) 203 for a multiplexing over to an intraoffice link. At this time, the data links on respective T1 lines 201 are not processed by corresponding digital terminals (DTs) 202, but instead they are multiplexed over to the intraoffice link by the corresponding digital terminals (DTs) 202 and processed in a batch by a terminator 205.

All time-divisional data on the intraoffice links are switched by a digital switching module (DSM) 204, and processed by various trunks, or transmitted to a subscriber accommodated in a foreign office or in the home office.

The terminator 205 is of particular relevance to this invention. As described earlier, it terminates the data links for five (5) T1 lines 201 multiplexed over to the intraoffice links and processes respective control data in a batch.

Figure 3:
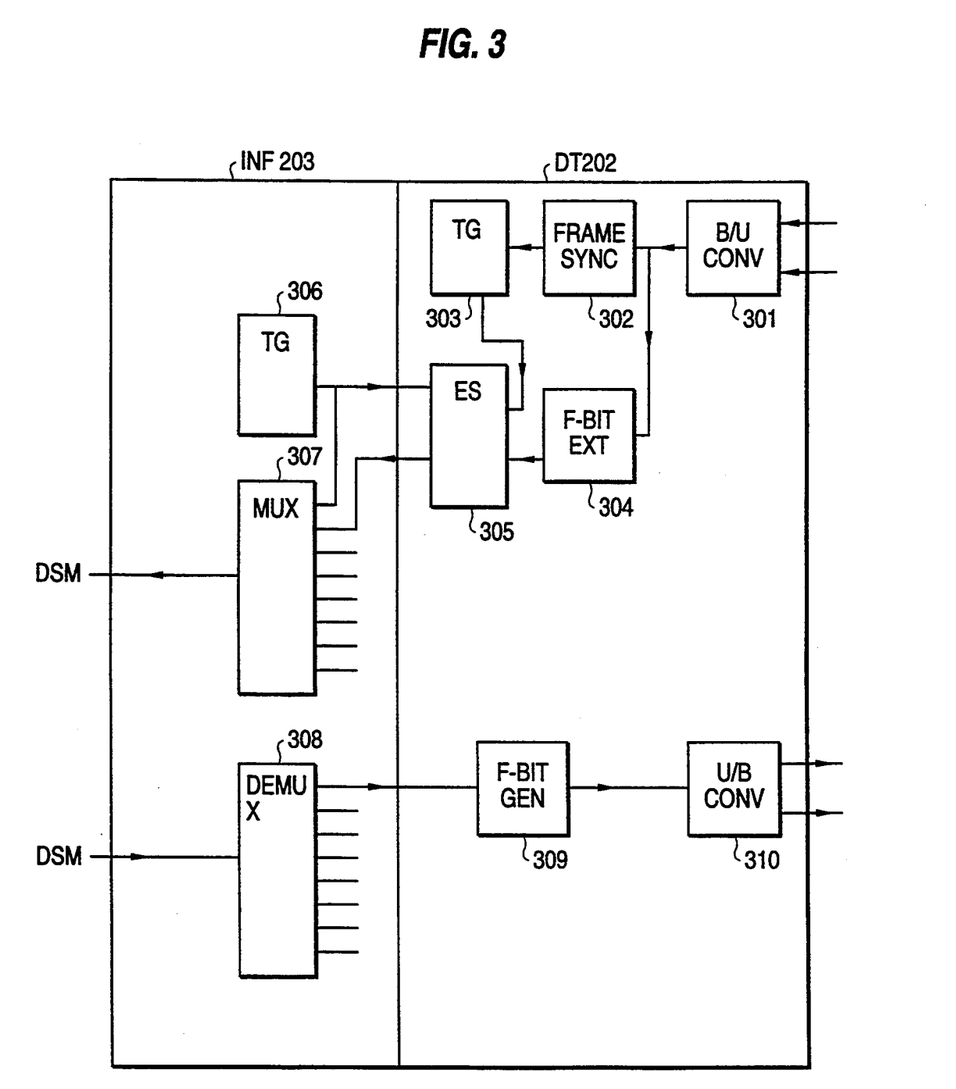
FIG. 3 is a block diagram showing a connection between an INF (interfacer) and a DT (digital terminal)

FIG. 3 is a block diagram showing a connection between the interfacer (INF) 203 and one (1) of the digital terminals (DTs) 202.

Although FIG. 3 shows only one (1) of the digital terminals (DTs) 202, all the digital terminals (DTs) 202, #0 through #4 for five (5) T1 lines 202 #0 through #4, respectively, are actually connected to a multiplexer (MUX) 307 and a demultiplexer (DEMUX) 308 in the interfacer (INF) 203. (Refer to FIG. 2.)

First, the bipolar/unipolar converter (B/U CONV) 301 in this one of the DTs 202 is a circuit for converting a line signal transmitted in a bipolar signal format over the corresponding one of T1 lines 201.

A frame synchronizer (FRAME SYNC) 302 extracts a received clock and a synchronization bit (F bit) from a received line signal, and synchronizes frames and multiframes. (This is described later.)

An F bit extractor (F-BIT EXT) 304 extracts only F bit data (described later) and outputs them to an elastic store (ES) 305.

A timing generator (TG) 303 supplies a write pulse synchronized with a received clock extracted at the frame synchronizer 304. It also outputs a reset pulse for resetting a write address in the elastic store (ES) 305 at a head end timing of a multiframe (to be described later) extracted by the frame synchronizer (FRAME SYNC) 302.

The elastic store (ES) 305 is a buffer for synchronizing a transmission rate of F bit data between the line side and the office side. It updates the write addresses according to a write clock from the timing generator (TG) 303 and sequentially writes F bit data outputted from the F bit extractor (F-BIT EXT) 304 into respective write addresses. At this time, as described above a reset pulse from the timing generator (TG) 303 causes the internal write addresses to be reset to the head end address.

Next, the timing generator (TG) 306 in the interfacer (INF) 203 supplies to the elastic store (ES) 305 a read pulse synchronized with a master clock (not shown) generated inside the switcher. It also outputs a reset pulse for resetting a read address of the elastic store (ES) 305 at an interval of the multiframes.

This causes the elastic store (ES) 305 to update read addresses according to the read clock from the timing generator (TG) 306 and to read F bit data sequentially from respective addresses. At this time, the elastic store (ES) 305 rests the internal read address to the head end address by a reset pulse from the timing generator (TG) 306. The elastic store (ES) 305 performs its read operations independently from its write operations.

The multiplexer (MUX) 307 in the interfacer (INF) 203 multiplexes the F bit data outputted from the elastic store (ES) 305 in the respective digital terminals (DTs) 202, #0 through #4, over to predetermined bits (which will be described latter) in predetermined channels of the intraoffice links. The multiplexer (MUX) 307 outputs, to the digital switching module (DSM) 203 shown in FIG. 2, the multiplexed signals by further multiplexing them with communication signals (not shown).

Meanwhile, the demultiplexer (DEMUX) 308 demultiplexes the control data multiplexed at the predetermined bits in the predetermined channels from data on intraoffice links outputted from the digital switching module (DSM) 203, and outputs them to the appropriate one of the digital terminals (DTs) 202.

An F bit generator (F-BIT GEN) 309 each in the corresponding one of the digital terminals (DTs) 202 outputs control data for the corresponding one of the T1 lines 201 supplied from the demultiplexer (DEMUX) 308 in the interfacer (INF) 203 by filling the control data in the F bits outputted at a timing of a predetermined frame of the corresponding line.

A unipolar/bipolar converter (U/B CONV) 310 converts the above F bits in a unipolar signal format and the communication signals for the corresponding one of the T1 lines 201 demultiplexed by a demultiplexer (not shown) into a bipolar signal format and outputs the converted signals to the corresponding one of the T1 lines 201.

The operations of the preferred embodiment shown in FIGS. 2 and 3 are further explained in detail below.

Figure 4:
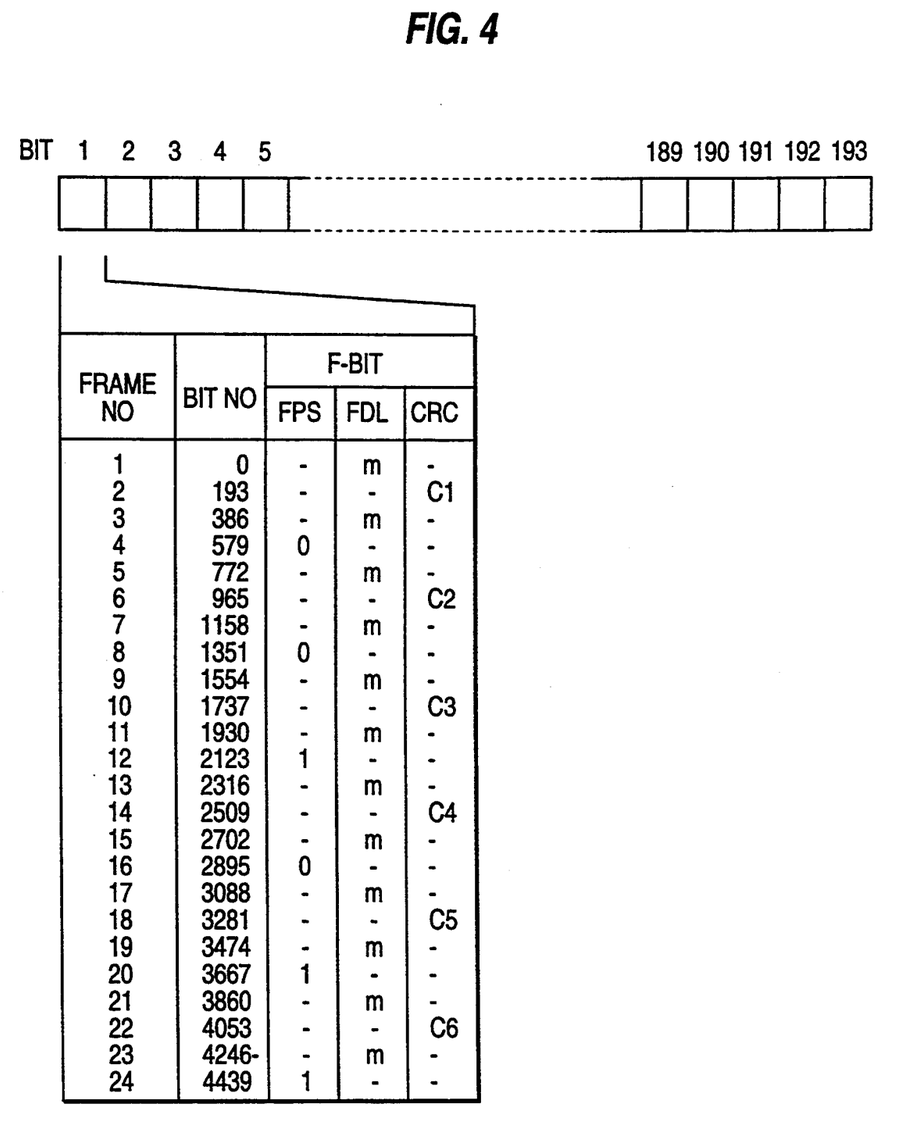
FIG. 4 shows a format of an extended super frame.

FIG. 4 shows the format of an extended super frame.

More specifically, FIG. 4 shows a frame format of line data transmitted on each of the T1 lines 201. Frames on T1 lines 201 are called extended super frames.

The T1 lines 201 are ISDN primary rate interfaces having a transmission rate of one point five four four megabits per second (1.544 Mbits/s) on which twenty-four (24) channels each with eight (8) bit data are multiplexed time-divisionally. A frame is configured by further adding an F bit at the head end. That is, one (1) frame comprises one hundred ninety-three (193) bits. ($8 \times 24 + 1 = 193$) Such twenty-four (24) frames form a multiframe.

Here, the bit pattern "001011" formed by respective F bits in frames numbered four (4), eight (8), twelve (12), sixteen (16), twenty (20) and twenty-four (24) is called an FPS (Framing Pattern Sequence). The frame synchronizer (FRAME SYNC) 302 (refer to FIG. 3) in the corresponding one of the digital terminals (DTs) 202, #0 through #4, (refer to FIG. 2) extracts the bit pattern and synchronizes multiframes.

A data link having a transmission rate of four kilobits per second (4 Kbits/s) configured by the F bit (m) in the odd numbered frame in such a multiframe is most related to this invention. It is called an FDL (Facility Data Link) and is used for transmitting interoffice control data.

C1 through C6 in respective F bits of frames numbered two (2), six (6), ten (10), fourteen (14), eighteen (18) and twenty-two (22) in the above described multiframe are called CRC [(CRC-6) Cyclic Redundancy Check] codes and are used for detecting errors in transmitted data.

The FDL (Facility Data Link) having the format shown in FIG. 4 transmitted over respective T1 lines 201 #0 through #4 shown in FIG. 2 is terminated in the switcher to be processed. A feature of this embodiment is that the terminator 205 shown in FIG. 2 processes the data links of the five (5) T1 lines in a batch, instead of individually by the corresponding digital terminals (DTs) 202 #0 through #4 as in a prior art.

Therefore, the digital terminals (DTs) 202 #0 through #4 and the interfacer (INF) 203 multiplexes the F bits of the corresponding T1 lines 201 over to the intraoffice links and the digital switching module (DSM) 204 inputs them to the terminator 205. The terminator 205 demultiplexes in a batch the FDLs (Facility Data Links) contained in F bits of respective T1 lines 201 (refer to FIG. 4).

Here, the intraoffice links in the digital switching module (DSM) 204 has a configuration in which one hundred twenty-eight (128) channels are multiplexed. Of these one hundred twenty-eight (128) channels, one hundred twenty (120) are used as signal channels for multiplexing signals on the five T1 lines 201, each comprising twenty-four (24) channels, and the remaining eight (8) are used as control channels. The F bits of the five (5) T1 lines 201 are multiplexed by using eight (8) bits in one of these eight (8) control channels.

Figure 5:
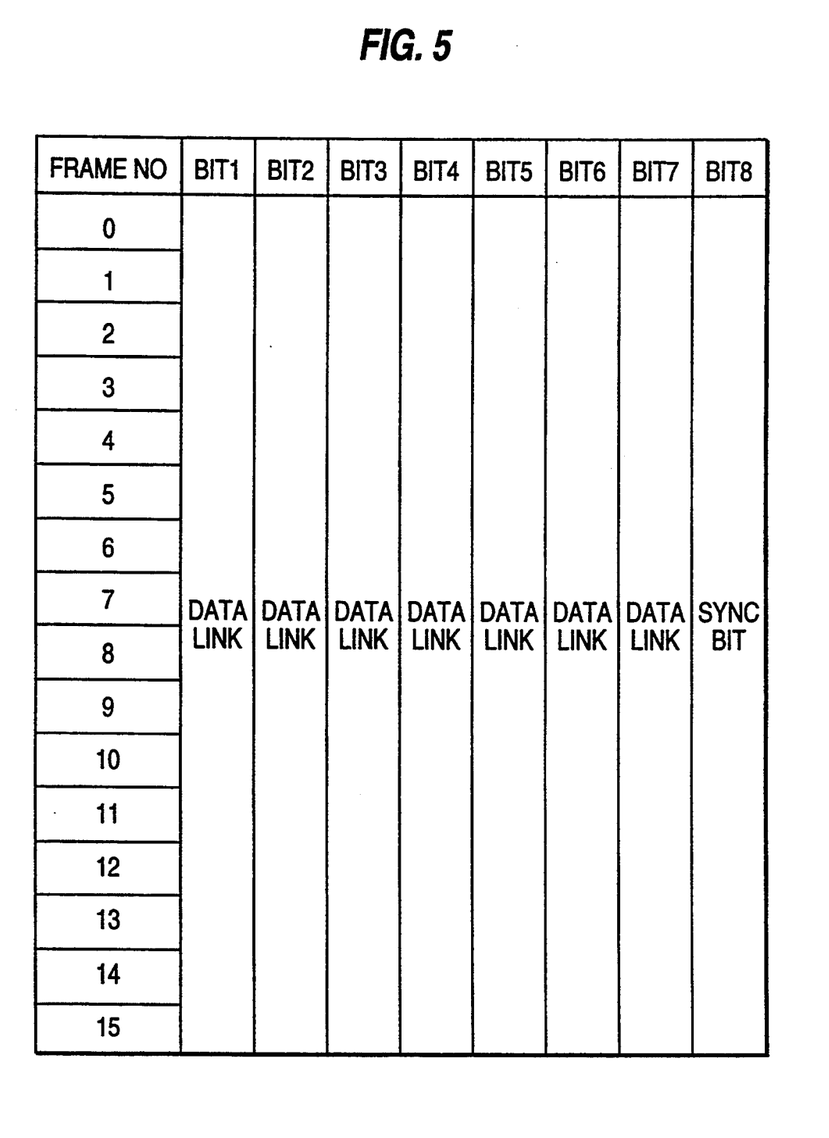
FIG. 5 shows the bit format of an intraoffice link.

FIG. 5 shows the bit format of an intraoffice link.

For instance, the F bits from #0 through #4 of the five (5) T1 lines 201 shown in FIG. 2 are multiplexed in bits numbered one (1) through five (5). Bits six (6) and seven (7) can be used e.g. as reserves. Bit eight (8) stores an F bit (frame synchronization bit), which is one of the bits forming the FPS (Framing Pattern Sequence).

Here, the multiplexer (MUX) 307 (shown in FIG. 3) in the interfacer (INF) 203 multiplexes the F bits from #0 through #4 of the five (5) T1 lines 201, such that the head ends (timing of frame numbered 1 shown in FIG. 4) of multiframes from respective T1 lines 201 are parallelly multiplexed.

That is, each elastic store (ES) 305 in the corresponding one of the digital terminals (DTs) 202, #0 through #4, writes the F bit of a multiframe from the corresponding one of the five (5) T1 lines 201 at its head end address by using a reset pulse outputted from the timing generator 303 at the input timing. The interfacer (INF) 203 reads the F bits (each stored at the head end address of the corresponding elastic store (ES) 305) from respective T1 lines 201, #0 through #4, by a read pulse. The read pulse is supplied commonly from the timing generator (TG) 306 to each elastic store (ES) 305 in the corresponding one of the digital terminals (DTs) 202, #0 through #4.

The timing generator (TG) 306 designates, as a read address, the head end address of each elastic store (ES) 305 provided in the corresponding one of the five (5) digital terminals (DTs) 202, #0 through #4, at the same timing as the timing generator (TG) 306 supplies a reset pulse commonly to each elastic store (ES) 305 at the multiframe interval. This causes the multiplexer (MUX) 307 in the interfacer (INF) 203 to parallelly receive the F bits in the head ends (frames 1) of the multiframes respectively from the T1 lines 201.

Each elastic store (ES) 305 in the corresponding one of the five (5) digital terminals (DTs) 202 has a memory capacity not less than that for a multiframe. This ensures that the head ends of the multiframes to be paralleled without dropping any of the F bits are received at different frame timings from the T1 lines 201.

The above operation allows the F bits from the five (5) T1 lines 201 to be multiplexed on the bits corresponding to respective T1 lines 201. At this time, the multiplexer (MUX) 307 sets "1" in bit 8 (refer to FIG. 5) at a timing when all the F bits in the head ends (frames 1) of multiframes from respective T1 lines 201 are multiplexed. It also sets "0" in bit 8 at all other timings.

The terminator 205 shown in FIG. 2 recognizes the head ends of multiframes each comprising twenty-four (24) frames from the line side as the timing in which "1" of the above bit eight is detected.

The terminator 205 extracts only the F bits in the odd numbered frames of all the F bits from respective T1 lines 201 inputted in the frame format shown in FIG. 4 across the range of several frames in addition to the respective bit timings shown in FIG. 5, and demultiplexes them as the FDLs (Facility Data Links) for respective T1 lines.

Thus, the terminator 205 executes in a batch a predetermined control for data of the FDLs (Facility Data Links) on respective lines extracted for respective bit timings.

Because the F bits of the T1 lines 201 are transmitted "as is" all the way to the terminator 205, the digital terminals (DTs) 202 and the interfacer (INF) 203 need not extract only the FDLs (Facility Data Links), and the processing loads at the digital terminals (DTs) 202 and the interfacer (INF) 203 are greatly reduced.

Although each of the multiframes on the T1 lines 201 comprises twenty-four (24) frames, that on the intraoffice link comprises sixteen (16) frames as shown in FIG. 5. Therefore, the frame number on the intraoffice link, to whose bit 8 (refer to FIG. 5) the multiplexer (MUX) 307 set "1", is different for each multiframe.

In reverse to the above operation, when the terminator 205 outputs the FDLs (Facility Data Links) to the corresponding T1 lines 201, the terminator 205 multiplexes the FDL (Facility Data Link) data for the corresponding T1 lines 201 in the bit format shown in FIG. 5 over to the intraoffice link.

Here, the terminator 205 need not attach an FPS (Framing Pattern Sequence) bit pattern for frame synchronization or a CRC (Cyclic Redundancy Check) bit for error detection and correction. Accordingly, the terminator 205 multiplexes the FDL (Facility Data Link) data on the intraoffice link in the format shown in FIG. 5.

Figure 6:
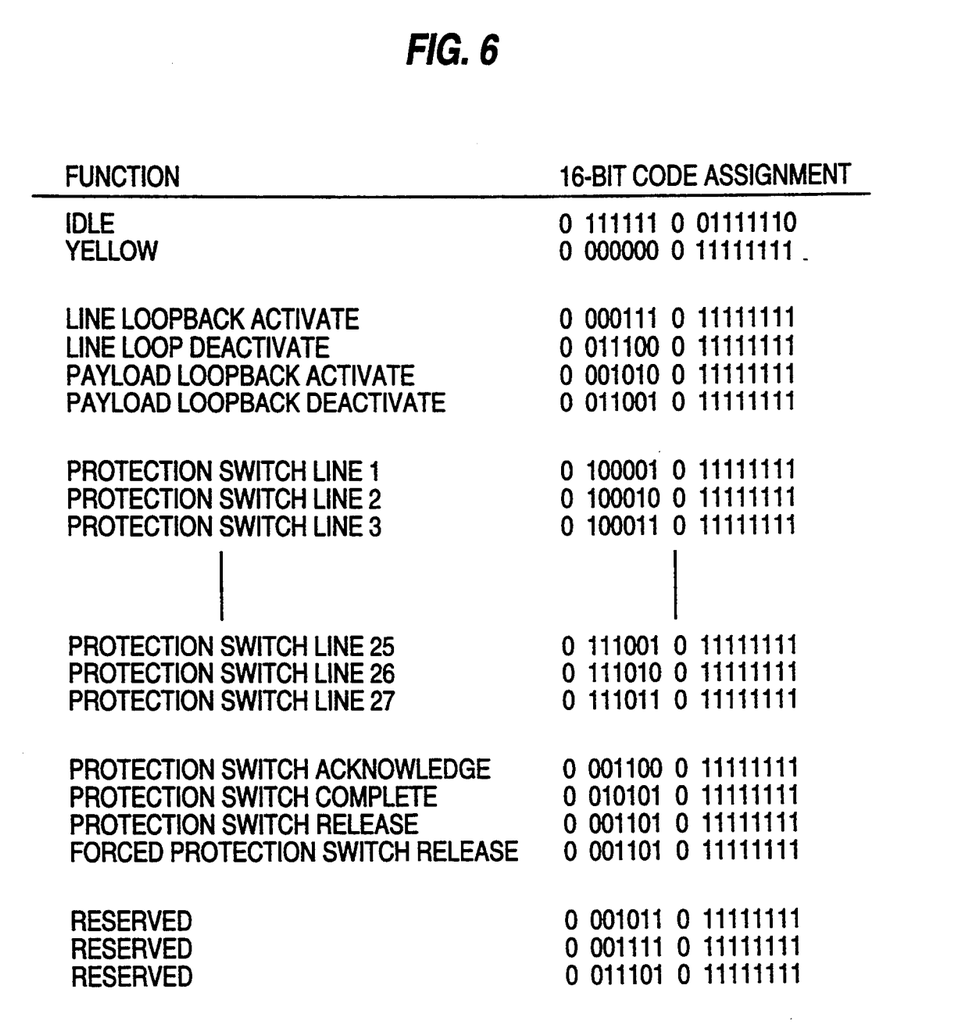
FIG. 6 shows a format of a bit-oriented data link.
Figure 7A:
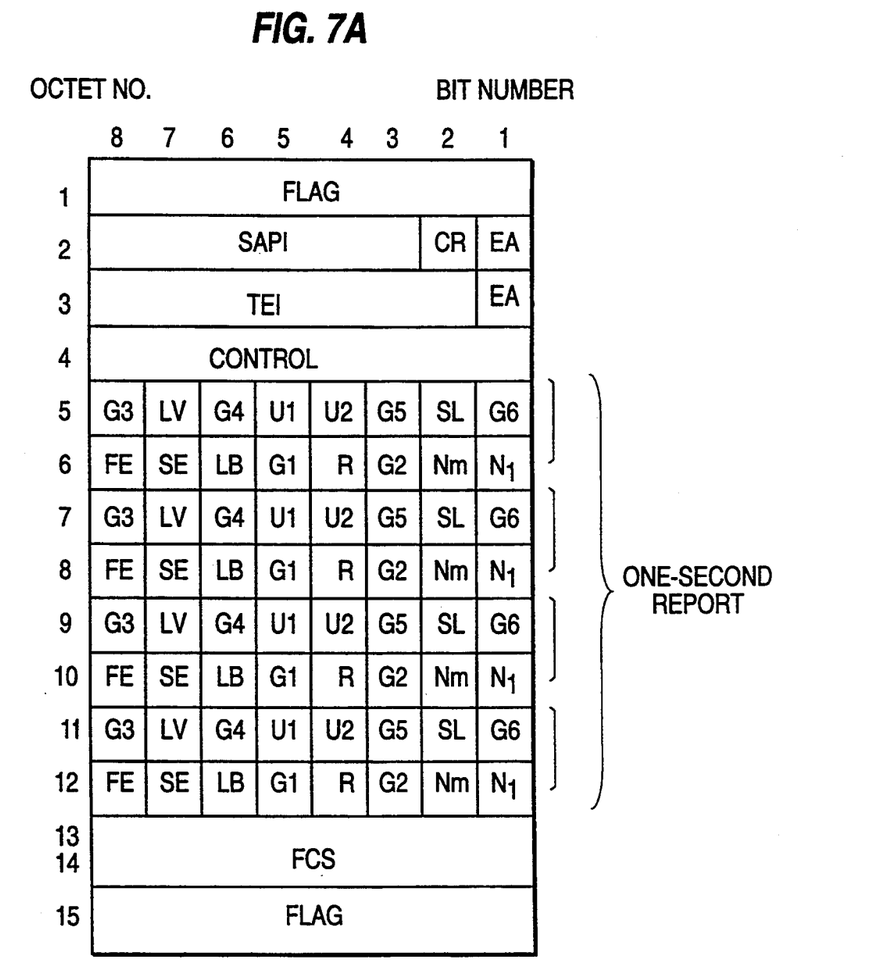
FIGS. 7A and 7B show a format of a scheduled performance report message.

There is no need to set data in bit 8 in the bit format shown in FIG. 5 because FDL (Facility Data Link) data, together with the FPS (Framing Pattern Sequence) data and CRC (Cyclic Redundancy Check) data, are transmitted to the terminator 205 in a batch as F bits on the receiving side. Therefore, the terminator 205 needs to recognize the head end of a multiframe by using bit 8 shown in FIG. 5. However, on the transmission side, the terminator 205 outputs only FDL (Facility Data Link) data in the odd numbered frames. The FDL (Facility Data Link) data are not transmitted in multiframes each comprising twenty-four (24) frames as shown in FIG. 4. Instead they are transmitted by a different transmission protocol, examples of which are shown in FIGS. 6 and 7A. Consequently, bit 8 need not be set with a datum for distinguishing the head end of a multiframe in bit 8 according to the bit format shown in FIG. 5.

The demultiplexer (DEMUX) 308 demultiplexes FDL (Facility Data Link) data for respective T1 lines 201 multiplexed on the corresponding bits (refer to FIG. 5) on the intraoffice link by the terminator 205 and outputs the demultiplexed data to the corresponding DT 202.

Each F bit generator (F-BIT GEN) 309 in the corresponding one of the digital terminals (DTs) 202 generates the FPS (Framing Pattern Sequence) data and CRC (Cyclic Redundancy Check) data shown in FIG. 4, builds those data, together with the FDL (Facility Data Link) data, into extended super frames according to the F bit frame format shown in FIG. 4, and outputs them through the unipolar/bipolar converter (U/B CONV) 310 to the corresponding one of the T1 lines 201.

FIG. 6 shows a format of a bit-oriented data link.

Figure 7B:
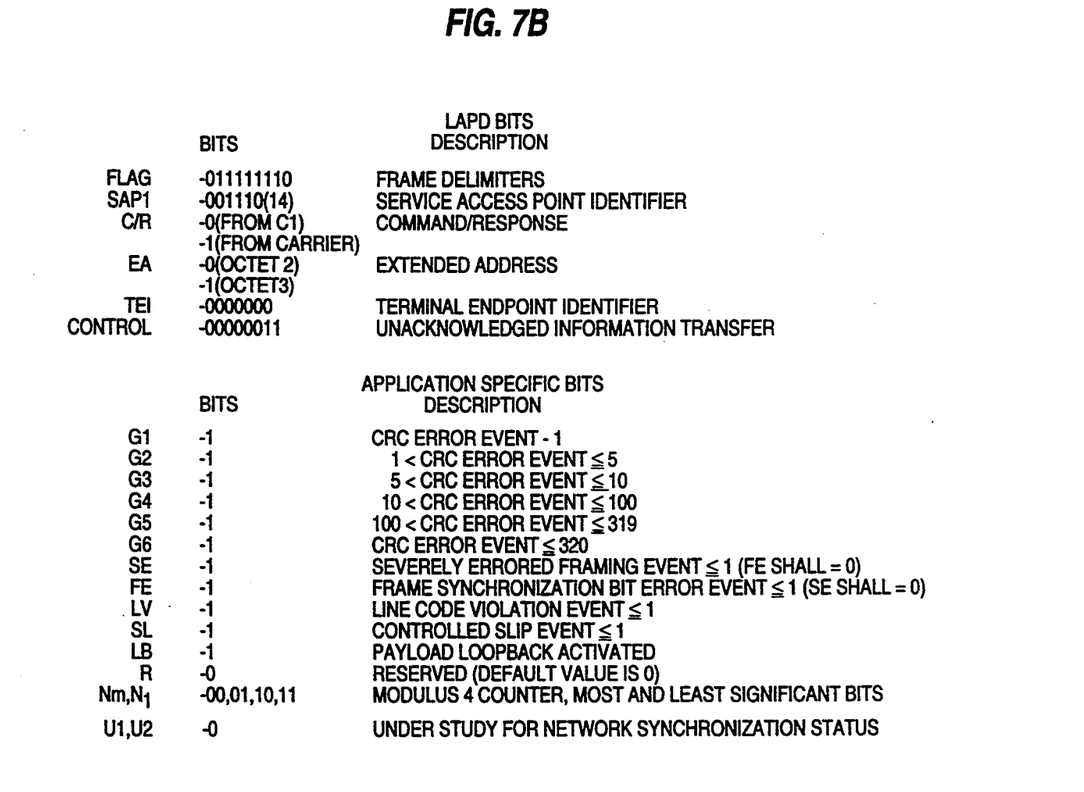

FIGS. 7A and 7B show the format of a scheduled performance report message.

More specifically, FIGS. 6 and 7A show two (2) examples of transmission protocols on an FDL (Facility Data Link).

The bit-oriented data link format shown in FIG. 6 and the scheduled performance report message shown in FIG. 7A form parts of the FDL (Facility Data Link) transmission format for a PRI (Primary Rate Access) interface and an IDLC (Integrated Digital Loop Carrier) interface according to the US LSSGR standards. The transmission format shown in FIG. 6 is used for line maintenance, whereas that shown in FIG. 7A is used for monitoring line quality. Although these transmission formats can be jointly used on an FDL (Facility Data Link), the transmission format shown in FIG. 6 is prioritized. The transmission formats shown in FIGS. 6 and 7A are briefly described below.

The bit-oriented data link format shown in FIG. 6 is explained first.

With this format, a code is assigned in sixteen (16) bits. The first (1st) and eighth (8th) bits of the sixteen (16) bit code receive "0", while the ninth (9th) through sixteenth (16th) bits basically receive "1". The second (2nd) through seventh (7th) bits designate a control content (hereafter referred to as a "function").

In FIG. 6, "Idle" is a function transmitted when there is no control data to be transmitted. In this case only, the ninth (9th) through sixteenth (16th) bits receive "01111110".

"YELLOW" is a correspondent office alarm function for notifying the correspondent of a fault detected in the home office.

"LINE LOOPBACK ACTIVATE" is a function for instructing a line turnaround when a fault arises, and "LINE LOOPBACK DEACTIVATE" is a function for instructing a termination of the line turnaround.

"PAYLOAD LOOPBACK ACTIVATE" is a function for instructing only the control data turnaround, and "PAYLOAD LOOPBACK DEACTIVATE" is a function for instructing a termination of the control data turnaround.

"PROTECTION SWITCH LINE 1" through "PROTECTION SWITCH LINE 27" are functions for instructing lines to be switched to other lines from "PROTECTION SWITCH LINE 1" through "PROTECTION SWITCH LINE 27".

"PROTECTION SWITCH ACKNOWLEDGE", "PROTECTION SWITCH COMPLETE", "PROTECTION SWITCH RELEASE" and "PROTECTION SWITCH FORCED RELEASE" are various control functions related to the above switching instructions.

Also, three (3) "RESERVED" are functions reserved for further control enhancements in the future.

As is evident from the above outline, the transmission format shown in FIG. 6 is used for controlling line maintenance.

The scheduled performance report message format shown in FIG. 7A is explained next.

With this format, a frame based on the LAPD format for use in a data link layer of an ISDN receives a control data format for the FDL (Facility Data Link).

As shown in FIG. 7A, in the LAPD format, frame data comprises fifteen (15) octets, in which one (1) octet of a FLAG (Frame Delimiter) is at one end and another one (1) octet of the same FLAG is at the other end. The terminator 205 shown in FIG. 2 obtains the control data for the FDL (Facility Data Link) discussed below. The LAPD (Link Access Protocol by D channel) format also has address data and control data, such as SAPI, TEI, C/R, E/A, CONTROL and FCS.

Of the data composing the LAPD format, the fifth (5th) through twelfth (12th) octets receive the "Scheduled Performance Report Message" format as FDL (Facility Data Link), which is described by referring to FIG. 7B as follows.

Bits G1 through G6 notify the numbers of line error events [detected as a CRC (Cyclic Redundancy Check) result] within the corresponding range, as shown in FIG. 7B.

Bit SE notifies a continuous occurrence of frame asynchronizations. Bit FE notifies an intermittent occurrence of frame asynchronizations.

Bit LV notifies a misinput of a bipolar signal, as a line signal, in a unipolarity by not properly alternating "0" and "1".

Bit SL notifies a data slip in a synchronous control between the line side and the office side, e.g. by an elastic store.

Bits $N_m$ and $N_1$ are modulus "4" counters for preventing a frame dropout during an LAPD frame transmission on the FDL (Facility Data Link), by cyclically specifying values "00", "01", "10", "11","00", "01", "10", "11", . . . as frame number data.

As is evident from the above outline, the transmission format shown in FIG. 7A is used for notifying the line communications quality.

By setting the transmission format exemplified in FIG. 6 or 7A on the FDL (Facility Data Link) data shown in FIG. 4, the control data can be efficiently transmitted. The terminator 205 shown in FIG. 2 performs a necessary control by recognizing the above transmission format.

Although the above embodiment describes an example in which only one (1) terminator 205 is used, as shown in FIG. 2, an application of this invention is not limited to this embodiment only. Instead, a plurality of terminators may be made to ratably process the data loads of the data links for predetermined numbers of lines. Also, more than one (1) intraoffice link can be provided. Finally, it goes without saying that the number of lines accommodated by a switcher is not limited to five (5), such as the T1 lines 201, #0 through #4, shown in FIG. 2.

What is claimed is:

1. A data link terminator for terminating respective data links corresponding to respective time-divisionally multiplexed digital lines, comprising:

multiplexing means for multiplexing data, including frame synchronization bits, received from the respective data links corresponding to respective digital lines by processing a facility data link included in the frame synchronization bits, and for outputting said multiplexed data over an intraoffice link; and terminating means for extracting said data of the respective data links corresponding to respective digital lines multiplexed over the intraoffice link, and for processing said data in a batch.

2. The data link terminator according to claim 1, wherein:

data transmitted over said respective digital lines are configured as multiframes; and said data received from said respective data links are configured by using frame synchronization bits for respective said multiframes at predetermined frame timings.

3. The data link terminator according to claim 2, wherein:

said multiplexing means multiplexes frame synchronization bits of respective frames received from the respective data links corresponding to said respective digital lines, and sends the multiplexed frame synchronization bits to said intraoffice link, said frame synchronization bits in a leading frame of said respective multiframes from said respective digital lines being multiplexed in parallel; and said terminating means extracts said data of said data links received from said respective digital lines by detecting the frame synchronization bits multiplexed to said intraoffice link.

4. The data link terminator according to claim 3, wherein:

said multiplexing means comprises a plurality of buffering means, each provided for one of said respective digital lines, for writing frame synchronization bits from said respective digital lines in a write operation by updating write addresses in synchronization with a received clock extracted from said respective digital lines, for resetting said write addresses by a write-side reset pulse generated after detecting a leading frame of one of said multiframes on each of said digital lines, for reading the frame synchronization bits by updating read addresses by a read pulse common to said respective digital lines independently of said write operation, and for resetting said read addresses by a read-side reset pulse common to said respective digital lines; and said multiplexing means multiplexes frame synchronization bits of respective frames received from the data links corresponding to said respective digital lines over said intraoffice link, such that said buffering means causes the frame synchronization bits in the leading frames of said multiframes from said respective digital lines to be multiplexed in parallel.

5. The data link terminator according to claim 3, wherein:

said multiplexing means multiplexes identification data indicating the leading frames of said multiframes in multiplexing the frame synchronization bits of respective frames from said respective digital lines; and said terminating means extracts, based on said identification data, said data of said data links received from said respective digital lines by detecting said frame synchronization bits from said respective digital lines multiplexed over said intraoffice link.

6. The data link terminator according to claim 1, wherein:

said multiplexing means multiplexes said data of said data links received from said respective digital lines to provide predetermined bits in correspondence with said respective digital lines for predetermined control channels in said intraoffice link.

7. A data link terminator according to claim 1, wherein:

said data links have a transmission format of a bit-oriented data link for a primary rate access interface.

8. The data link terminator according to claim 1, wherein:

said data links have a transmission format of a scheduled performance report message transmission for an integrated digital loop carrier.

9. A data link terminator, for terminating respective data links corresponding to respective time-divisionally multiplexed digital lines, comprising:

multiplexing means for multiplexing data, including frame synchronization bits, received from the respective data links corresponding to respective digital lines by processing a facility data link included in the frame synchronization bits, and for outputting said multiplexed data over an intraoffice link terminating means for extracting said data of the respective data links corresponding to said respective digital lines multiplexed over said intraoffice link, and for processing the extracted data in a batch, and for multiplexing data of said data links sent to said respective digital lines through said intraoffice link; and demultiplexing means for demultiplexing said data received from said terminating means via the intraoffice link, and for outputting the demultiplexed data to said respective digital lines.

10. A data link terminator for terminating respective data links corresponding to respective time-divisionally multiplexed digital lines, said data links transmitting data including frame synchronization bits having a facility data link, comprising:

an intraoffice link;

receiving means for receiving data multiplexed by processing the facility data link included in the frame synchronization bits over the intraoffice link; and terminating means for extracting said data of the respective data links corresponding to respective digital lines, and for processing said data in a batch.

* * * * *